(12) United States Patent
Rosen

(10) Patent No.: US 10,331,078 B2
(45) Date of Patent: *Jun. 25, 2019

(54) APPARATUS AND METHOD FOR RECORDING FRESNEL HOLOGRAMS

(71) Applicant: CellOptic, Inc., Rockville, MD (US)

(72) Inventor: Joseph Rosen, Omer (IL)

(73) Assignee: CellOptpic, Inc., Rockville, MD (US)

(*) Notice: Subject to any disclaimer, the term of this patent is extended or adjusted under 35 U.S.C. 154(b) by 3 days.

This patent is subject to a terminal disclaimer.

(21) Appl. No.: 15/631,926

(22) Filed: Jun. 23, 2017

(65) Prior Publication Data

US 2017/0293262 A1 Oct. 12, 2017

Related U.S. Application Data

(63) Continuation of application No. 15/208,300, filed on Jul. 12, 2016, now Pat. No. 9,690,255, which is a
(Continued)

(51) Int. Cl.
*G03H 1/08* (2006.01)
*G02B 5/18* (2006.01)
(Continued)

(52) U.S. Cl.
CPC ......... *G03H 1/0866* (2013.01); *G02B 5/1876* (2013.01); *G03H 1/041* (2013.01);
(Continued)

(58) Field of Classification Search
CPC .. G03H 1/00; G03H 1/0005; G03H 2001/005; G03H 1/02; G03H 2001/0208;
(Continued)

(56) References Cited

U.S. PATENT DOCUMENTS 3,831,031 A 8/1974 Barrett et al.
4,146,295 A 3/1979 Fonrojet et al.
(Continued)

FOREIGN PATENT DOCUMENTS

WO WO 2008-020790 A1 1/2008

OTHER PUBLICATIONS

J. B. Breckinridge, "Two-Dimensional White Light Coherence Interferometer", Appl. Opt. vol. 13, No. 12, pp. 2760-2762, Dec. 1974.
(Continued)

*Primary Examiner* — Arnel C Lavarias
(74) *Attorney, Agent, or Firm* — Nixon & Vanderhye, P.C.

(57) ABSTRACT

An apparatus for producing a hologram of an object includes a light source that emits an incoherent electromagnetic wave toward the object, and a masking device configured to display a mask, receive the incoherent electromagnetic wave emitted toward the object, mask the received incoherent electromagnetic wave according to the displayed mask, and produce a masked electromagnetic wave. The apparatus also includes an image recording device configured to capture an image of the masked electromagnetic wave, and a processing device configured to convert the image of the masked electromagnetic wave into the hologram of the object. A method for producing a hologram of an object is also described.

16 Claims, 2 Drawing Sheets

Related U.S. Application Data continuation of application No. 13/890,930, filed on May 9, 2013, now Pat. No. 9,417,609, which is a continuation of application No. 13/184,279, filed on Jul. 15, 2011, now abandoned, which is a continuation of application No. 12/022,892, filed on Jan. 30, 2008, now Pat. No. 8,009,340.

(60) Provisional application No. 60/887,273, filed on Jan. 30, 2007.

(51) Int. Cl.
    *G03H 1/04* (2006.01)
    *G03H 1/06* (2006.01)
    *G03H 5/00* (2006.01)
    *G03H 1/02* (2006.01)

(52) U.S. Cl.
    CPC .............. *G03H 1/0443* (2013.01); *G03H 1/06* (2013.01); *G03H 1/08* (2013.01); *G03H 1/0891* (2013.01); *G03H 5/00* (2013.01); *G03H 2001/0224* (2013.01); *G03H 2001/0447* (2013.01); *G03H 2001/0452* (2013.01); *G03H 2001/0458* (2013.01); *G03H 2210/30* (2013.01); *G03H 2223/23* (2013.01)

(58) Field of Classification Search
    CPC ......... G03H 2001/0216; G03H 1/0443; G03H 2001/0447; G03H 2001/0452; G03H 1/06; G03H 1/0866; G03H 1/0891; G03H 2223/12; G03H 2223/52
    USPC ....... 359/30, 9, 1, 10, 11, 27, 28, 29, 31, 35
    See application file for complete search history.

(56) References Cited

U.S. PATENT DOCUMENTS

| | | |
|---|---|---|
| 8,009,340 B2 | 8/2011 | Rosen |
| 8,179,578 B2 | 5/2012 | Rosen et al. |
| 9,417,609 B2 | 8/2016 | Rosen |
| 9,690,255 B2 * | 6/2017 | Rosen ................ G02B 5/1876 |
| 2009/0303559 A1 | 12/2009 | Rosen et al. |
| 2012/0224236 A1 | 9/2012 | Rosen et al. |

OTHER PUBLICATIONS

Indebetouw et al., "Scanning holographic microscopy with transverse resolution exceeding the Rayleigh limit and extended depth of focus", J. Opt. Soc. Am. A, vol. 22, No. 5, May 2005.

A.W. Lohmann, "Wavefront Reconstruction for Incoherent Objects", J. Opt. Soc. Am. vol. 55, pp. 1555-1556, Nov. 1965.

Stroke et al., "Holography With Spatially Non Coherent Light", Appl. Phys. Lett., vol. 7, No. 9, Nov. 1965.

Cochran et al., "New Method of Making Fresnel Transforms with Incoherent Light", J. Opt. Soc. Am., vol. 56, No. 11, pp. 1513-1517, Nov. 1966.

P.J. Peters, "Incoherent Holograms With Mercury Light Source", Appl. Phys. Lett., vol. 8, No. 8, 209-210, Apr. 15, 1966.

Worthington, Jr. et al., "Production of Holograms with Incoherent Illumination", J. Opt. Soc. Am., vol. 56, No. 10, pp. 1397-1398, Oct. 1966.

A. S. Marathay, "Non-coherent-object hologram: its reconstruction and optical processing", J. Opt. Soc. Am. A, vol. 4, No. 10, pp. 1861-1868, Oct. 1987.

G. Sirat et al., Conoscopic holography, Opt. Lett., vol. 10, No. 1, pp. 4-6, Jan. 1985.

Li et al., "Computer-generated holograms of three-dimensional realistic objects recorded without wave interference", Appl. Opt., vol. 40, No. 17, pp. 2864-2870, Jun. 10, 2001.

Sando et al., "Holographic three-dimensional display synthesized from three-dimensional Fourier spectra of real Existing Objects," Optics Lettters, vol. 28, No. 24, pp. 2518-2520, Dec. 15, 2003.

T. Poon, "Three-Dimensional Image Processing and Optical Scanning Holography", Adv. in Imag. & Elec. Phys., vol. 126, pp. 329-350, 2003.

Mertz et al., "Fresnel Transformations of Images", in Proceedings of Conference on Optical Instruments and Techniques, K.J. Habell, ed. (Chapman and Hall, London 1961).

J. Goodman, "Fresnel and Fraunhofer Diffraction", Introduction to Fourier Optics, 2nd ed., McGraw-Hill, New York, 1996, pp. 63-95, Chapter 4.

Rosen et al., "Digital spatially incoherent Fresnel holography", Optics Lettters, vol. 32, No. 8, Apr. 15, 2007, pp. 912-914.

Rosen et al., "Fluorescence incoherent color holography", Optics Express, vol. 15, No. 5, Mar. 5, 2007, pp. 2244-2250.

Yamaguchi et al., "Phase-shifting digital holography", Optics Lettters, vol. 22, No. 16, pp. 1268-1270, Aug. 15, 1997.

Rosen et al., "Non-scanning Motionless Fluorescence Three-dimensional Holographic Microscopy", Nature Photonics, vol. 2, Mar. 2008, pp. 190-195.

Rosen et al., "A Review of Incoherent Digital Fresnel Holography", J. Holography and Speckle, vol. 5, No. 2, 2009, pp. 1-17.

Rosen et al., "Review of Three-Dimensional Holographic Imaging by Fresnel Incoherent Correlation Holograms", 3D Research, vol. 1, No. 1, Dec. 1, 2009, pp. 010103-1-010103-9.

* cited by examiner

APPARATUS AND METHOD FOR RECORDING FRESNEL HOLOGRAMS

CROSS-REFERENCE TO RELATED APPLICATIONS

This application is a continuation of U.S. application Ser. No. 15/208,300 filed Jul. 12, 2016 (U.S. Pat. No. 9,690,255, issue date Jun. 27, 2017), which is a continuation of U.S. application Ser. No. 13/890,930 filed May 9, 2013 (U.S. Pat. No. 9,417,649, issue date Aug. 16, 2016) which is a continuation of application Ser. No. 13/184,279 filed Jul. 15, 2011 (abandoned), which is a continuation of application Ser. No. 12/022,892, filed Jan. 30, 2008, (U.S. Pat. No. 8,009,340 issued Aug. 30, 2011), which claims priority to Provisional U.S. Patent Application No. 60/887,273, filed Jan. 30, 2007, the entire contents of each of which are incorporated herein by reference.

BACKGROUND OF THE INVENTION

Field of the Invention

This invention relates to an apparatus and method for recording information, such as Fresnel holograms, and in particular, to recording lensless digital incoherent Fresnel holograms using a mask, such as an absorption-only mask.

Discussion of the Background

Holograms recorded by incoherent light open many new applications like outdoor and astronomical holography (J. B. Breckinridge, "Two-Dimensional White Light Coherence Interferometer," Appl. Opt. 13, 2760 (1974)) and fluorescence holographic microscopy (G. Indebetouw, A. El Maghnouji, R. Foster, "Scanning holographic microscopy with transverse resolution exceeding the Rayleigh limit and extended depth of focus," J. Opt. Soc. Am. A 22, 892-898 (2005)). The oldest methods of recording incoherent holograms have made use of the property that every incoherent object is composed of many source points each of which is self spatial coherent and therefore can create an interference pattern with light coming from the point's mirrored image. Under this general principle there are various types of holograms (J. B. Breckinridge, "Two-Dimensional White Light Coherence Interferometer," Appl. Opt. 13, 2760 (1974)) (A. W. Lohmann, "Wavefront Reconstruction for Incoherent Objects," J. Opt. Soc. Am. 55, 1555-1556 (1965)) (G. Sirat, D. Psaltis, "Conoscopic holography," Optics Letters, 10, 4-6 (1985)) including Fourier (J. B. Breckinridge, "Two-Dimensional White Light Coherence Interferometer," Appl. Opt. 13, 2760 (1974)) (G. W. Stroke and R. C. Restrick, "Holography with Spatially Incoherent Light," Appl. Phys. Lett. 7, 229 (1965)) and Fresnel holograms (G. Cochran, "New method of making Fresnel transforms," J. Opt. Soc. Am. 56, 1513-1517 (1966)) (P. J. Peters, "Incoherent holography with mercury light source," Appl. Phys. Lett. 8, 209-210 (1966)). The process of beam interfering demands high levels of light intensity, extreme stability of the optical setup and a relatively narrow bandwidth light source. These limitations have prevented holograms from becoming widely used for many practical applications.

More recently two groups of researchers have proposed to compute holograms of 3-D incoherently illuminated objects from a set of images taken from different points of view. (Y. Li, D. Abookasis and J. Rosen, "Computer-generated holograms of three-dimensional realistic objects recorded without wave interference," Appl. Opt. 40, 2864-2870 (2001)) (Y. Sando, M. Itoh, and T. Yatagai, "Holographic three-dimensional display synthesized from three-dimensional Fourier spectra of real existing objects," Opt. Lett 28, 2518-2520 (2003)) This method, although it shows promising prospects, is relatively slow since it is based on capturing tens of images of the subject scene from different view angles.

Another method is called scanning holography (G. Indebetouw, A. El Maghnouji, R. Foster, "Scanning holographic microscopy with transverse resolution exceeding the Rayleigh limit and extended depth of focus," J. Opt. Soc. Am. A. 22, 892-898 (2005)) (Poon T.-C., "Three-dimensional image processing and optical scanning holography," Adv. in Imag. & Elec. Phys. 126, 329-350 (2003)) in which a Fresnel Zone Plate (FZP) pattern is scanned across the object such that at each and every scanning position the light intensity is integrated by a point detector. The overall process yields a Fresnel hologram obtained as a correlation between the object and FZP patterns. However the scanning process is a relatively slow and is done by mechanical movements. A similar correlation is actually done also in the present work; however, unlike the case of scanning holography, we propose here a correlation without movement.

Mertz and Young (L. Mertz and N. O. Young, "Fresnel transformations of images," in *Proceedings of Conference on Optical Instruments and Techniques*, K. J. Habell, ed. (Chapman and Hall, London 1961) p. 305) already proposed holographic photography based on correlation without movement between object and FZPs. However, their process relies on geometrical optics, which cannot yield good imaging results in the optical regime. On the contrary, our suggested correlator for implementing the holographic recording is valid in the optical regime, since its operation principle is based on the diffraction theory (J. Goodman, *Introduction to Fourier Optics*, $2^{nd}$ ed., McGraw-Hill, New York, 1996, pp. 63-95 (Chapter 4)).

SUMMARY OF THE INVENTION

Accordingly, one object of this invention is to provide a novel apparatus for producing a hologram of an object, the apparatus comprising: a light source that emits an incoherent electromagnetic wave toward the object; a masking device configured to display a mask, receive the incoherent electromagnetic wave emitted toward the object, mask the received incoherent electromagnetic wave according to the displayed mask, and produce a masked electromagnetic wave; an image recording device configured to capture an image of the masked electromagnetic wave; and a processing device configured to convert the image of the masked electromagnetic wave into the hologram of the object.

Another object of this invention is to provide a novel method for producing a hologram of an object, the method comprising: emitting an incoherent electromagnetic wave toward the object; displaying a displayed mask; receiving the incoherent electromagnetic wave emitted toward the object; masking the received incoherent electromagnetic wave according to the displayed mask to produce a masked electromagnetic wave; capturing an image of the masked electromagnetic wave; converting the image of the masked electromagnetic wave into the hologram of the object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
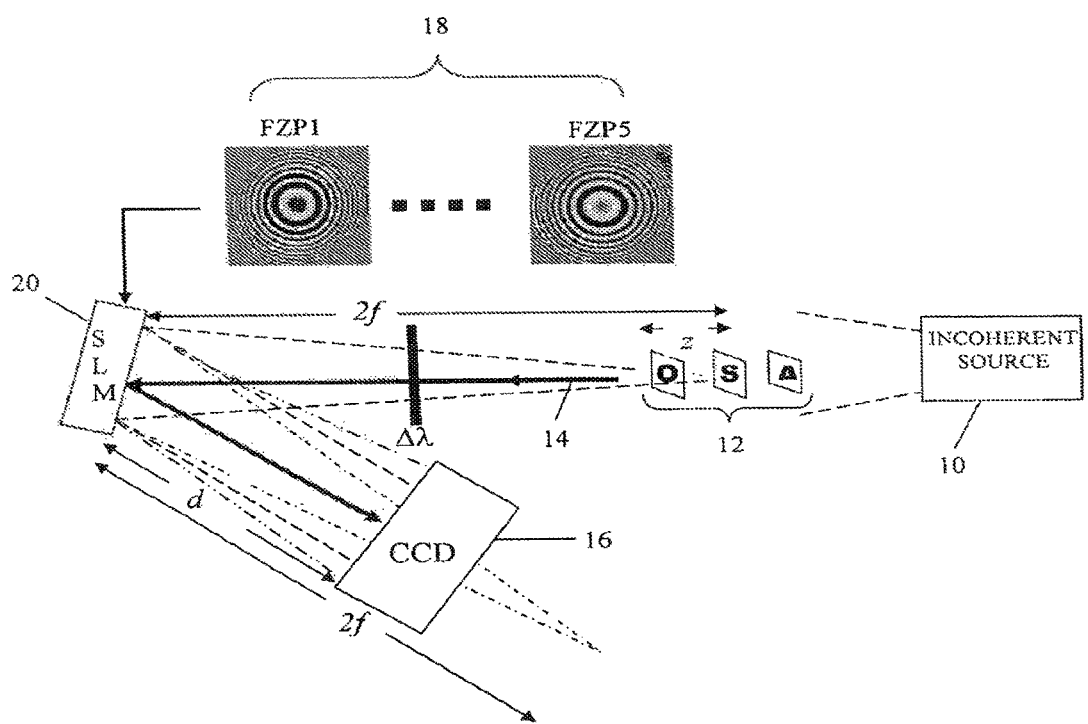
FIG. 1 is a schematic representation of an embodiment of the present invention.

The present invention includes a new method of recording digital holograms under incoherent illumination, and corresponding apparatuses that may be configured to record digital holograms under incoherent illumination. According to an embodiment of the invention, light is transmitted through, or reflected from a three-dimensional (3-D) object, propagated through an absorption Fresnel zone plate (FZP), and recorded by a digital camera. In one embodiment, five holograms are recorded sequentially, each for a different phase factor of the FZP, and the five recorded holograms are superposed such that the result is a complex valued Fresnel hologram. When the hologram is reconstructed, 3-D properties of the object are revealed.

Thus, the present invention includes a lensless method of recording digital Fresnel holograms under incoherent illumination. The present invention is an extension of the FINCH holographic technique which we have previously described (J. Rosen, and G. Brooker "Digital spatially incoherent Fresnel holography," Accepted for publication in Opt. Lett) (J. Rosen, and G. Brooker "Fluorescence incoherent color holography," Submitted for publication in Opt. Exp. (2007)) (Patents pending). In an embodiment of a method or apparatus according to the present invention, incoherent light transmitted through, or reflected from, a 3-D object propagates through an absorption-only FZP and is recorded by a digital camera. Five holograms may be recorded sequentially (or simultaneously under certain conditions) each with a different phase factor of the FZP. Information representing the five recorded holograms are superposed using a superposing process (for example using dedicated hardware or using a general purpose computing device such as a computer) such that the result is a complex valued Fresnel hologram. As we show in the following, the 3-D properties of the object are revealed by reconstructing this hologram using a digital reconstructing process.

The setup is lensless and contains absorption-only FZPs. These properties make the system suitable for operating with waves other than electromagnetic waves, or with electromagnetic waves in spectral regimes other than the visible light regime, in which it is impossible or extremely difficult to implement lenses and other phase elements. For electromagnetic waves the present system can be applied to x-rays, and therefore the method can be an important tool for medical imaging. The present invention may also be applied to 3D x-ray imaging, and elements of the inventive apparatus or method may be configured such that the radiation is transferred from the source through the semi-absorption object, rather than reflected from the object as we have shown in previous demonstrations of FINCH. (J. Rosen, and G. Brooker "Digital spatially incoherent Fresnel holography," Accepted for publication in Opt. Lett) (J. Rosen, and G. Brooker "Fluorescence incoherent color holography," Submitted for publication in Opt. Exp. (2007))

FIG. 1 shows a schematic view of a first embodiment of a lensless FINCH apparatus according to the present invention. The lensless FINCH apparatus includes an incoherent source 10 that illuminates a 3-D object 12 and the transmitted light 14 is captured by a CCD camera 16 after passing through the object 12 and reflecting from one or more reflective FZPs 18 displayed by a spatial light modulator (SLM) 20, or on another device that can be configured to change from one FZP to another.

Following is analysis of the inventive apparatus to demonstrate that the apparatus may produce a hologram of a 3D object. The apparatus can be analyzed as an incoherent correlator, where the FZP function is considered as a part of the system's transfer function. Alternatively, it may be more useful to analyze the apparatus as an incoherent interferometer, where the grating displayed on the SLM (i.e., the FZP) is considered as a beam splitter. In particular, the apparatus may be analyzed by following its response to an input object of a single infinitesimal point. Based on the point spread function (PSF) of the apparatus, the operation of the apparatus may be analyzed for any general object. Analysis of a beam originated from narrow band infinitesimal point source is done using Fresnel diffraction theory (J. Goodman, *Introduction to Fourier Optics*, 2$^{nd}$ ed., McGraw-Hill, New York, 1996, pp. 63-95 (Chapter 4)) since such a source is coherent by definition.

Referring to the embodiment of FIG. 1, a Fresnel hologram of a point object is obtained on a plane of the CCD 16 that is distance d from the SLM 20, when a reflection function $R(x_D, y_D)$ is real and positive in the form of, $$R(x_D, y_D) = \frac{1}{2} + \frac{1}{4}\exp\left[\frac{i\pi}{\lambda f}(x_D^2 + y_D^2) + i\theta\right] + \frac{1}{4}\exp\left[-\frac{i\pi}{\lambda f}(x_D^2 + y_D^2) - i\theta\right] \quad (1)$$

$$= \frac{1}{2} + \frac{1}{4}Q\left(\frac{1}{f}\right)\exp(i\theta) + \frac{1}{4}Q\left(-\frac{1}{f}\right)\exp(-i\theta),$$

Where λ is the central wavelength, and for reasons of increased clarity, the quadratic phase function is designated by the function Q such that $Q(b)=\exp[i\pi b/\lambda(x^2+y^2)]$.

The angle θ plays an important role later in the computation process in order to get rid of the twin images and the bias terms.

A point source located at the point $(0, 0, z_s)$ a distance $L=2f-z_s$ from the SLM 20 induces on the SLM plane a diverging spherical wave of the form of $Q(1/L)$. Right after the SLM 20, which has a reflection (or transmission) function given in Eq. (1), the complex amplitude of the wave is related to $Q\{1/(L)\}[0.5+0.25\cdot Q(-1/f)\exp(i\theta)+0.25\cdot Q(-1/f)\exp(i\theta)]$.

Finally, in the CCD plane a distance d from the FZP, the intensity of the recorded hologram of a point is, $$H_P(x, y) = A\left|\frac{1}{2}Q\left[\frac{1}{L}\right] + \frac{1}{4}Q\left[\frac{f+L}{Lf+df+Ld}\right]\exp(i\theta) + \right. \quad (2)$$

$$\left. \frac{1}{4}Q\left[\frac{f-L}{Lf+df-Ld}\right]\exp(-i\theta)\right|^2$$

$$= A\left|\frac{1}{2}Q[(2f-z+d)^{-1}] + \frac{1}{4}Q\left[\left(\frac{f(2f-z)}{3f-z}+d\right)^{-1}\right]\exp(i\theta) + \right.$$

$$\left. \frac{1}{4}Q\left[\left(\frac{-f(2f-z)}{f-z}+d\right)^{-1}\right]\exp(-i\theta)\right|^2 \propto 6 +$$

$$2Q[S_1]\exp(-i\theta) + 2Q[-S_1]\exp(i\theta) + 2Q[S_2]\exp(i\theta) +$$

$$2Q[-S_2]\exp(-i\theta) + Q[S_3]\exp(2i\theta) + Q[-S_3]\exp(-2i\theta)$$

-continued where $$S_1 = \frac{-L^2}{(L+d)(Lf+df+Ld)}, \quad (3)$$

$$S_2 = \frac{L^2}{(L+d)(Lf+df-Ld)},$$

$$S_3 = \frac{2L^2 f}{(Lf+df)^2 - L^2 d^2}.$$

Eq. (2) has seven different terms where for a good holographic recording only one term of quadratic function (Q function) should remain after the superposition. Otherwise, reconstructing the hologram given in Eq. (2) with its all seven terms will affect an overlap between all seven different images. Looking closely in Eq. (2), there are two terms with the constant 2 exp(i$\theta$) and two terms with 2 exp($-i\theta$). Therefore, we conclude that at least five holograms with different values of $\theta$'s angles are needed to be recorded, and to be superposed together, in order to get a single term out of the seven. Furthermore, the superposition can yield only one of the two terms Q[$S_3$] or Q[$-S_3$].

In order to remain with a single correlation term out of the seven terms given in Eq. (4), we follow the usual procedure of phase stepping (Patents pending), but with five holograms. Five holograms of the same object are recorded each of which with a different phase constant $\theta$. The final hologram $H_F$ is a superposition according to the following, $$H_F(x, y) = \frac{[H_1(x, y)\exp(i\theta_1) - H_5(x, y)\exp(i\theta_5)](A_3 B_2 - A_2 B_3)}{[\exp(2i\theta_1) - \exp(2i\theta_5)]} - \quad (4)$$

$$\frac{[H_2(x, y)\exp(i\theta_2) - H_5(x, y)\exp(i\theta_5)](A_3 B_1 - A_1 B_3)}{[\exp(2i\theta_2) - \exp(2i\theta_5)]} -$$

$$\frac{[H_3(x, y)\exp(i\theta_3) - H_5(x, y)\exp(i\theta_5)](A_3 B_2 - A_2 B_1)}{[\exp(2i\theta_3) - \exp(2i\theta_5)]} -$$

$$\frac{[H_4(x, y)\exp(i\theta_4) - H_5(x, y)\exp(i\theta_5)]}{(A_2 B_1 - A_2 B_3 - A_3 B_1 + A_1 B_3)}{[\exp(2i\theta_4) - \exp(2i\theta_5)]}$$

where $H_k$ is the kth recorded hologram with the phase constant $\theta_k$, and the constants are, $$A_k = \frac{\exp(i\theta_k) - \exp(i\theta_5)}{\exp(2i\theta_k) - \exp(2i\theta_5)} - \frac{\exp(i\theta_4) - \exp(i\theta_5)}{\exp(2i\theta_4) - \exp(2i\theta_5)} \quad (5)$$

$$B_k = \frac{\exp(-i\theta_k) - \exp(-i\theta_5)}{\exp(2i\theta_k) - \exp(2i\theta_5)} - \frac{\exp(-i\theta_4) - \exp(-i\theta_5)}{\exp(2i\theta_4) - \exp(2i\theta_5)}$$

The intensities of the five recorded holograms of an object are superposed according to Eq. (5). The result is an integral of the PSF, one quadratic phase function resulting from Eq. (5), over all object intensity $g(x_s, y_s, z_s)$, as follows $$H(x, y) \cong \quad (6)$$

$$A \int \int \int g(x_s, y_s, z_s) \exp\left\{\frac{i\pi S_3(z)}{\lambda}\left[\left(x + \frac{ax_s}{f}\right)^2 + \left(y + \frac{ay_s}{f}\right)^2\right] + i\theta\right\} dx_s dy_s dz_s$$

Eq. (4) is a correlation between an object and a quadratic phase, z-dependent, function, which means that the recorded hologram is indeed a Fresnel hologram.

A 3-D image s(x, y, z) can be reconstructed from $H_F(x, y)$ by calculating the Fresnel propagation formula, as follows, $$s(x, y, z) = H_F(x, y) * \exp\left[\frac{i\pi}{\lambda z}(x^2 + y^2)\right], \quad (7)$$

where the asterisk denotes a 2-D convolution.

There are numerous modifications based upon the lensless holographic concept and proof described above which are possible and are included in the present invention. For example, there are numerous other embodiments based on this invention that may speed up the image capture. The invention also includes related methods to reduce the number of holographic images which are needed to create a single hologram. Furthermore, the present invention also includes simultaneously capturing plural images and holograms, as described above, by splitting the captured image beam into five beams and simultaneously capturing the 5 described holograms.

Thus, the apparatus as described above, and a corresponding method, may record incoherent holograms of realistic 3-D objects using only absorption masks. Since the lensless FINCH system has only a single channel it does not demand complicated alignment. However, the invention also applies to operation using plural channels. The advantages of the present invention may be applied to the design of a portable and low cost holographic camera for electromagnetic waves other than just the visible light, which might be useful for various applications in medical imaging. (Patents pending)

Figure 2:
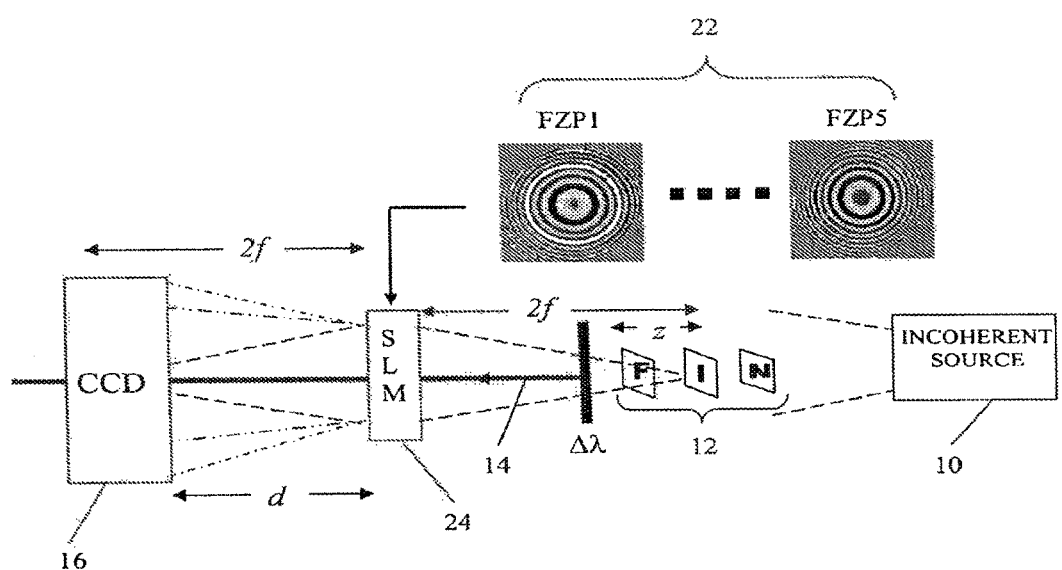
FIG. 2 is a schematic representation of another embodiment of the present invention.

FIG. 2 is a schematic diagram of an alternative embodiment of the lensless FINCH apparatus. The embodiment of FIG. 2 is similar to that of FIG. 1. However, in FIG. 2, an SLM 24 configured to produce transmissive FZPs 22 replaces the SLM 20 configured to produce reflective FZPs 18.

Numerous modifications and variations of the present invention are possible in light of the above teachings therefore to be understood that within the scope of the appended claims, the invention may be practiced otherwise than as specifically described herein.

The invention claimed is:

1. An apparatus for producing a hologram of an object, the apparatus comprising:
   a device configured to receive an incoherent electromagnetic wave reflected from or transmitted through a three-dimensional object, and propagate the received incoherent electromagnetic wave through an absorption-only Fresnel Zone Plate (FZP);
   an image recording device configured to capture an image of the propagated electromagnetic wave; and
   a processing system comprising at least one processor, the processing system being configured to generate the hologram of the three-dimensional object based on the image of the masked electromagnetic wave captured by the image recording device.

2. The apparatus of claim 1, wherein the incoherent electromagnetic wave is an x-ray wave.

3. The apparatus of claim 1, wherein the incoherent electromagnetic wave is a visible light.

4. The apparatus of claim 1, wherein the device is configured to display an absorption mask.

5. The apparatus of claim 1, wherein the device is configured to display a plurality of different absorption masks over a predetermined time period.

6. The apparatus of claim 1, wherein the device is configured to display a reflective absorption mask.

7. The apparatus of claim 1, wherein the device is configured to display a transmissive absorption mask.

8. The apparatus of claim 1, wherein the device includes a spatial light modulator (SLM) configured to change a displayed mask from one Fresnel Zone Pattern to another.

9. The apparatus of claim 1, wherein the device is configured to propagate the received incoherent electromagnetic wave through Fresnel Zone Patterns having a different phase factor, and the processing system generates the hologram using a plurality of images captured by the image recording device, each image being captured while the received incoherent electromagnetic wave is propagated through a different phase factors of the Fresnel Zone Pattern.

10. A method for producing a hologram of a three-dimensional object, the method comprising:
receiving an incoherent electromagnetic wave reflected from or transmitted through the three-dimensional object;
propagating the received incoherent electromagnetic wave through an absorption-only Fresnel Zone Plate (FZP);
capturing an image of the propagated electromagnetic wave; and
generate the hologram of the three-dimensional object based on the image of the captured masked electromagnetic wave.

11. The method of claim 10, wherein the incoherent electromagnetic wave is an x-ray wave.

12. The method of claim 10, wherein the incoherent electromagnetic wave is a visible light.

13. The method of claim 10, wherein the device includes an absorption mask.

14. The method of claim 10, wherein the device includes a reflective absorption mask.

15. The method of claim 10, wherein the device includes a transmissive absorption mask.

16. An apparatus for producing a hologram of an object, the apparatus comprising:
means for producing a electromagnetic wave by propagating an incoherent electromagnetic wave reflected from or transmitted through three-dimensional object through an absorption-only Fresnel Zone Plate (FZP);
an image recording device configured to capture an image of the propagated electromagnetic wave; and
a processing system comprising at least one processor, the processing system being configured to generate a hologram based on the image of the propagated electromagnetic wave captured by the image recording device.

* * * * *